(12) United States Patent
Numata et al.

(10) Patent No.: US 12,457,435 B2
(45) Date of Patent: Oct. 28, 2025

(54) PHOTOELECTRIC CONVERSION DEVICE, CONTROL METHOD, AND STORAGE MEDIUM WITH IMAGE CORRECTION PROCESSING

(71) Applicant: CANON KABUSHIKI KAISHA, Tokyo (JP)

(72) Inventors: Aihiko Numata, Tokyo (JP); Kan Takaiwa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 18/368,182

(22) Filed: Sep. 14, 2023

(65) Prior Publication Data

US 2024/0107199 A1   Mar. 28, 2024

(30) Foreign Application Priority Data

Sep. 28, 2022   (JP) ................ 2022-154574

(51) Int. Cl.
   *H04N 25/773*   (2023.01)
   *H04N 25/51*    (2023.01)

(52) U.S. Cl.
   CPC .......... *H04N 25/773* (2023.01); *H04N 25/51* (2023.01)

(58) Field of Classification Search
   CPC ........ H04N 23/81; H04N 25/51; H04N 25/62; H04N 25/621; H04N 25/671; H04N 25/674; H04N 25/68; H04N 25/773; H04N 25/683; H04N 25/79; C08F 2/001; C08F 2/26; C08F 212/08; C08F 212/36; C08F 220/06; C08F 220/14; C08F 220/1804; C08F 220/1808; C08F 220/283; C08F 220/44;

(Continued)

(56) References Cited

U.S. PATENT DOCUMENTS 9,319,607 B2   4/2016   Numata
9,402,041 B2   7/2016   Numata
(Continued)

FOREIGN PATENT DOCUMENTS

EP   4228278 A1   8/2023

OTHER PUBLICATIONS

Quan Chau et al., Analysis and Modeling of Optical Crosstalk in InP-based Geiger-mode Avalanche Photodiode FPAs, Proceedings of SPIE, IEEE, vol. 9492 (May 13, 2015).

(Continued)

*Primary Examiner* — Antoinette T Spinks
(74) *Attorney, Agent, or Firm* — Venable LLP

(57) ABSTRACT

To provide a photoelectric conversion device that has an avalanche photodiode and can suppress image quality deterioration, in a photoelectric conversion device, a photoelectric conversion element including an avalanche photodiode for photoelectrically converting an optical image, an image generation unit configured to generate a first image based on a signal acquired by the photoelectric conversion element, an acquisition unit configured to acquire first characteristic information of the photoelectric conversion element, and a correction processing unit configured to perform first correction processing on the first image by using the first characteristic information are provided, and in the correction processing unit, weighting of the first correction processing is made different according to a magnitude of a pixel signal in the first image.

17 Claims, 16 Drawing Sheets

(58) Field of Classification Search
CPC .............. C08F 222/103; C08F 2400/02; C08F 257/02; C08F 265/02; C08F 265/04; C08F 265/06; C08F 285/00; H10F 39/809

See application file for complete search history.

(56) References Cited

U.S. PATENT DOCUMENTS

| | | | |
|---|---|---|---|
| 9,470,825 B2 | 10/2016 | Numata et al. | |
| 10,362,279 B2* | 7/2019 | Jeong | H04N 25/672 |
| 12,219,278 B2 | 2/2025 | Morimoto et al. | |
| 12,267,601 B2* | 4/2025 | Wang | H04N 25/703 |
| 2015/0170376 A1* | 6/2015 | Bishop | H04N 25/68 382/167 |
| 2016/0309102 A1 | 10/2016 | Koizumi | |
| 2017/0085849 A1* | 3/2017 | Jeong | H04N 25/672 |
| 2018/0275252 A1 | 9/2018 | Fried et al. | |
| 2021/0029315 A1* | 1/2021 | Sakato | H04N 25/773 |
| 2022/0280042 A1* | 9/2022 | Antaris | G01N 21/6408 |
| 2023/0020674 A1* | 1/2023 | Kim | H04N 23/81 |
| 2023/0048442 A1* | 2/2023 | Moreira | H04N 25/671 |
| 2024/0098381 A1* | 3/2024 | Takado | H04N 25/671 |
| 2024/0107192 A1* | 3/2024 | Numata | H04N 25/51 |
| 2024/0292124 A1* | 8/2024 | Takaiwa | G01J 1/44 |

OTHER PUBLICATIONS

Search Report dated Feb. 1, 2024, in European Patent Application No. 23199070.6.

Rech et al., "Optical crosstalk in single photon avalanche diode arrays: a new complete model", OpEx, 16 (12), 2008.

U.S. Appl. No. 18/368,108, filed Sep. 14, 2023 (First Named Inventor: Aihiko Numata).

Official Communication dated May 6, 2025, in European Patent Application No. 23199070.6.

* cited by examiner

FIG. 7

| 0%   | 0%   | 0.2% | 0%   | 0%   |
|------|------|------|------|------|
| 0%   | 0.4% | 1%   | 0.4% | 0%   |
| 0.2% | 1%   |      | 1%   | 0.2% |
| 0%   | 0.4% | 1%   | 0.4% | 0%   |
| 0%   | 0%   | 0.2% | 0%   | 0%   |

PHOTOELECTRIC CONVERSION DEVICE, CONTROL METHOD, AND STORAGE MEDIUM WITH IMAGE CORRECTION PROCESSING

BACKGROUND OF THE INVENTION

Field of the Invention

The present invention relates to a photoelectric conversion device including an avalanche photodiode, a control method, a storage medium, and the like.

Description of the Related Art

In recent years, there has been proposed a photoelectric conversion device that digitally counts the number of photons arriving at avalanche photodiodes (APDs) and outputs the count value as photoelectrically converted digital signal from pixels.

It is known that a phenomenon referred to as avalanche light emission occurs in a photoelectric conversion device including an APD (I. Rech et al., "Optical crosstalk in single photon avalanche diode arrays: a new complete model", OpEx 16 (12), 2008). However, when avalanche light emission occurs, the generated secondary electrons are incident on an adjacent pixel, so that the count number of adjacent pixel values increases, and an erroneous count occurs.

SUMMARY OF THE INVENTION

A photoelectric conversion device of one aspect of the invention comprising: a photoelectric conversion element including an avalanche photodiode for photoelectrically converting an optical image; at least one processor or circuit configured to function as: an image generation unit configured to generate a first image based on a signal acquired by the photoelectric conversion element; an acquisition unit configured to acquire first characteristic information of the photoelectric conversion element; and a correction processing unit configured to perform first correction processing on the first image by using the first characteristic information, wherein, in the correction processing unit, weighting of the first correction processing is made different according to a magnitude of a pixel signal in the first image.

Further features of the present invention will become apparent from the following description of embodiments with reference to the attached drawings.

BRIEF DESCRIPTION OF THE DRAWINGS

FIG. 7 is a diagram illustrating a probability distribution of the occurrence of erroneous counting between adjacent pixels of a photoelectric conversion element 100 as first array data.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
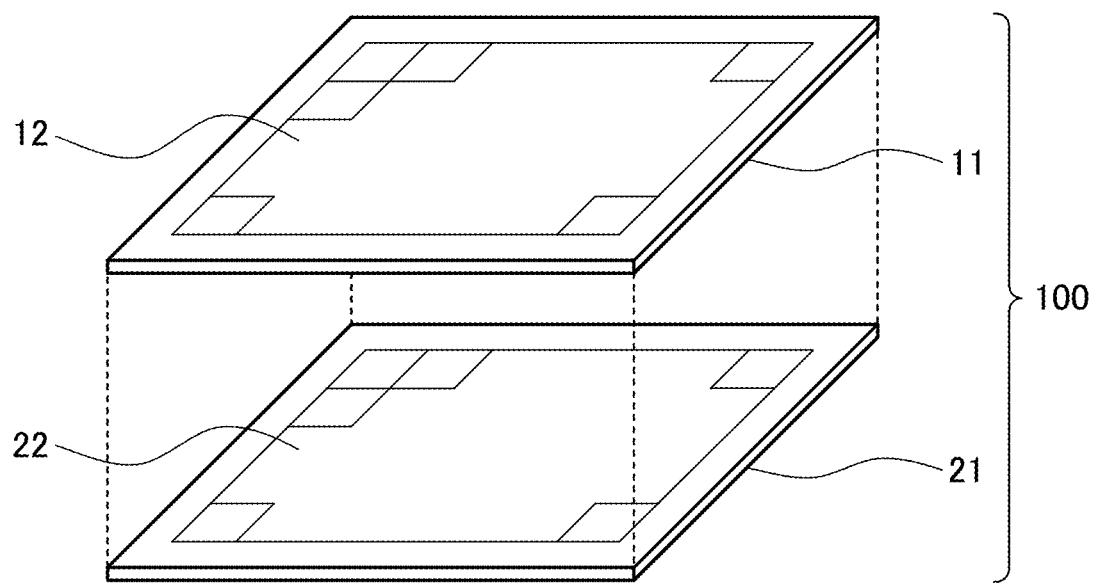
FIG. 1 is a diagram illustrating a configuration example of a photoelectric conversion element in the first embodiment.

FIG. 1 is a diagram illustrating a configuration example of a photoelectric conversion element of the first embodiment. Hereinafter, a photoelectric conversion device having referred to as stacked structure in which the photoelectric conversion element 100 is configured by stacking and electrically connecting two substrates of a sensor substrate 11 and a circuit board 21 will be described as an example.

However, a structure referred to as a non-stacked structure in which a configuration included in a sensor substrate and a configuration included in a circuit substrate are disposed on a shared semiconductor layer may be adopted. The sensor substrate 11 includes a pixel region 12. The circuit board 21 includes a circuit region 22 that processes a signal that has been detected in the pixel region 12.

Figure 2:
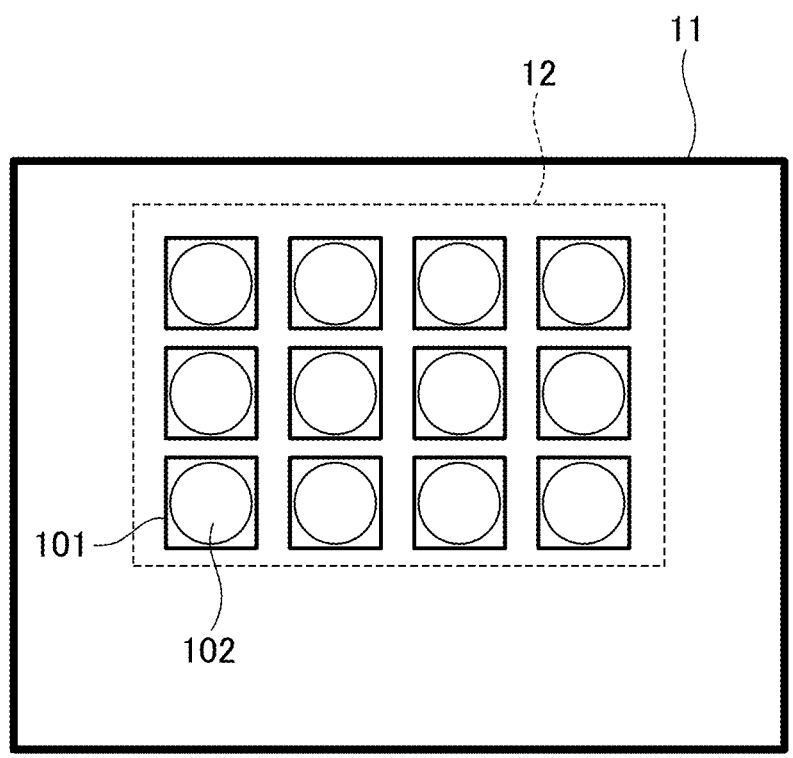
FIG. 2 is a diagram showing a configuration example of a sensor substrate 11.

FIG. 2 shows an example of a configuration of the sensor substrate 11. The pixel region 12 of the sensor substrate 11 includes a plurality of pixels 101 that have been arranged in a two-dimensional manner across a plurality of rows and columns. The pixel 101 is provided with a photoelectric conversion unit 102 that includes an avalanche photodiode (hereinafter, referred to as "APD"). Note that the number of rows and columns of the pixel array constituting the pixel region 12 is not limited, in particular.

Figure 3:
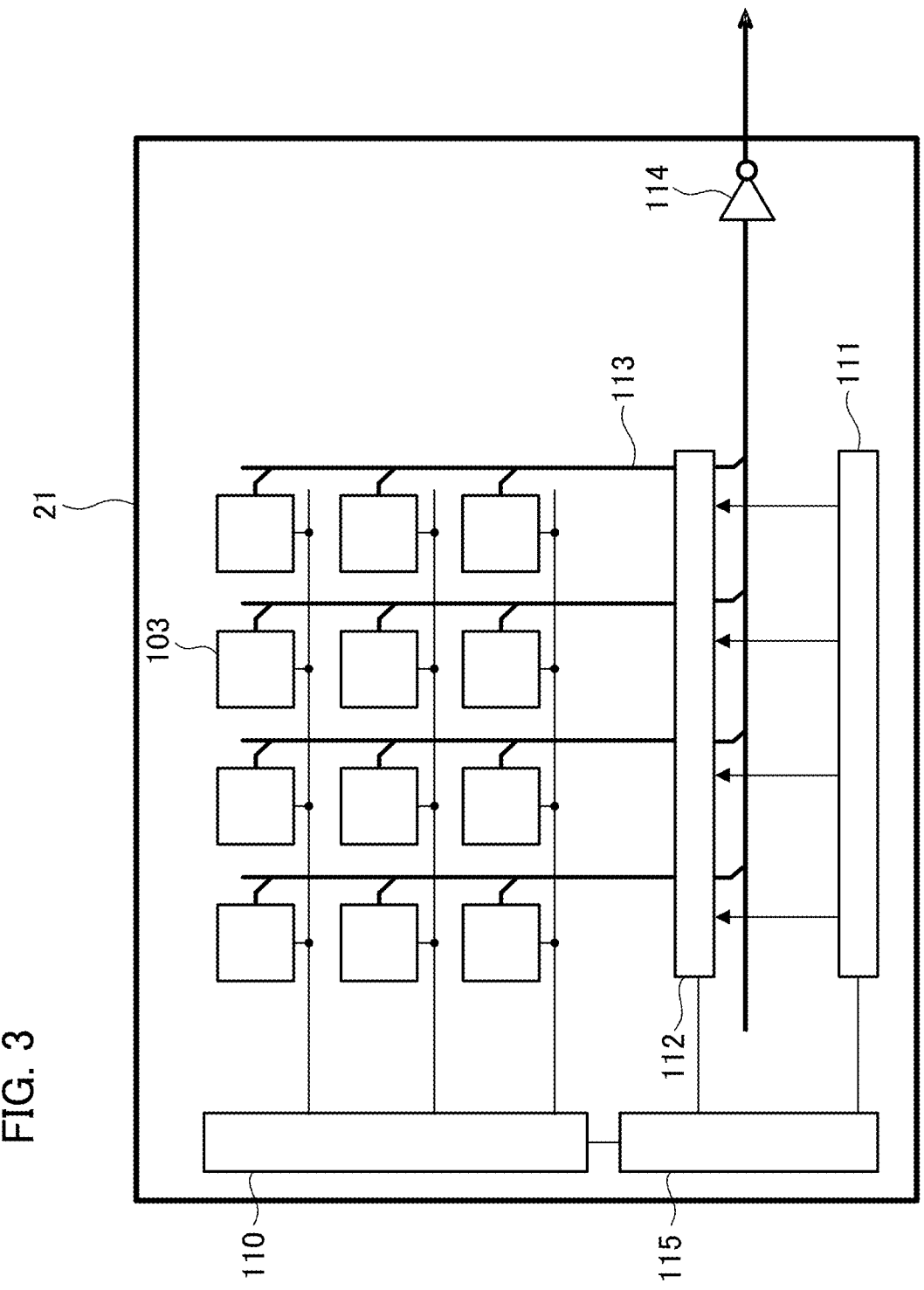
FIG. 3 is a diagram showing a configuration example of a circuit board 21.

FIG. 3 is a diagram showing an example of a configuration of the circuit board 21. The circuit board 21 has the signal processing circuit 103 that processes the photoelectrically converted charge in each of the photoelectric conversion units 102 in FIG. 2, a readout circuit 112, a control pulse generating unit 115, a horizontal scanning circuit 111, a vertical signal line 113, a vertical scanning circuit 110, and an output circuit 114.

The vertical scanning circuit 110 receives control pulses supplied from the control pulse generating unit 115, and supplies control pulses sequentially to a plurality of pixels arranged in the row direction. Logic circuits such as a shift register and an address decoder are used in the vertical scanning circuit 110.

The signals that have been output from the photoelectric conversion unit 102 of each pixel are processed by each of the signal processing circuit 103. In the signal processing circuit 103, a counter and memory are provided, and digital values are held in the memory. The horizontal scanning circuit 111 inputs a control pulse for sequentially selecting each column to the signal processing circuit 103 in order to read a signal from the memory of each pixel in which a digital signal is held.

A signal from the signal processing circuit 103 of the pixel in the row selected by the vertical scanning circuit 110 is output to the vertical signal line 113. The signal that has been output to the vertical signal line 113 is output to the outside of the photoelectric conversion device 100 via the readout circuit 112 and the output circuit 114.

As shown in FIG. 2 and FIG. 3, a plurality of the signal processing circuits 103 is arranged in the region overlapping the pixel region 12 in a planar view. In addition, the vertical scanning circuit 110, the horizontal scanning circuit 111, the readout circuit 112, the output circuit 114, and the control pulse generating unit 115 are arranged so as to overlap between the end of the sensor substrate 11 and the end of the pixel region 12 in the planar view.

In other words, the sensor substrate 11 has pixel regions 12 and non-pixel regions that are arranged around the 12 pixel regions. In addition, the vertical scanning circuit 110, the horizontal scanning circuit 111, the readout circuit 112, the output circuit 114, and the control pulse generating unit 115 are arranged in the region overlapping the non-pixel area in planar view.

Note that the arrangement of the vertical signal line 113, and the arrangement of the readout circuit 112, and the output circuit 114 are not limited to the example shown in FIG. 3. For example, the vertical signal lines 113 may be arranged so as to extend in the row direction, and the readout circuit 112 may be arranged at the end where the vertical signal line 113 extends. Additionally, the signal processing circuit 103 does not necessarily have to be provided for each of all the photoelectric conversion units, and one signal processing unit may be shared by a plurality of photoelectric conversion units to sequentially perform the signal processing.

Figure 4:
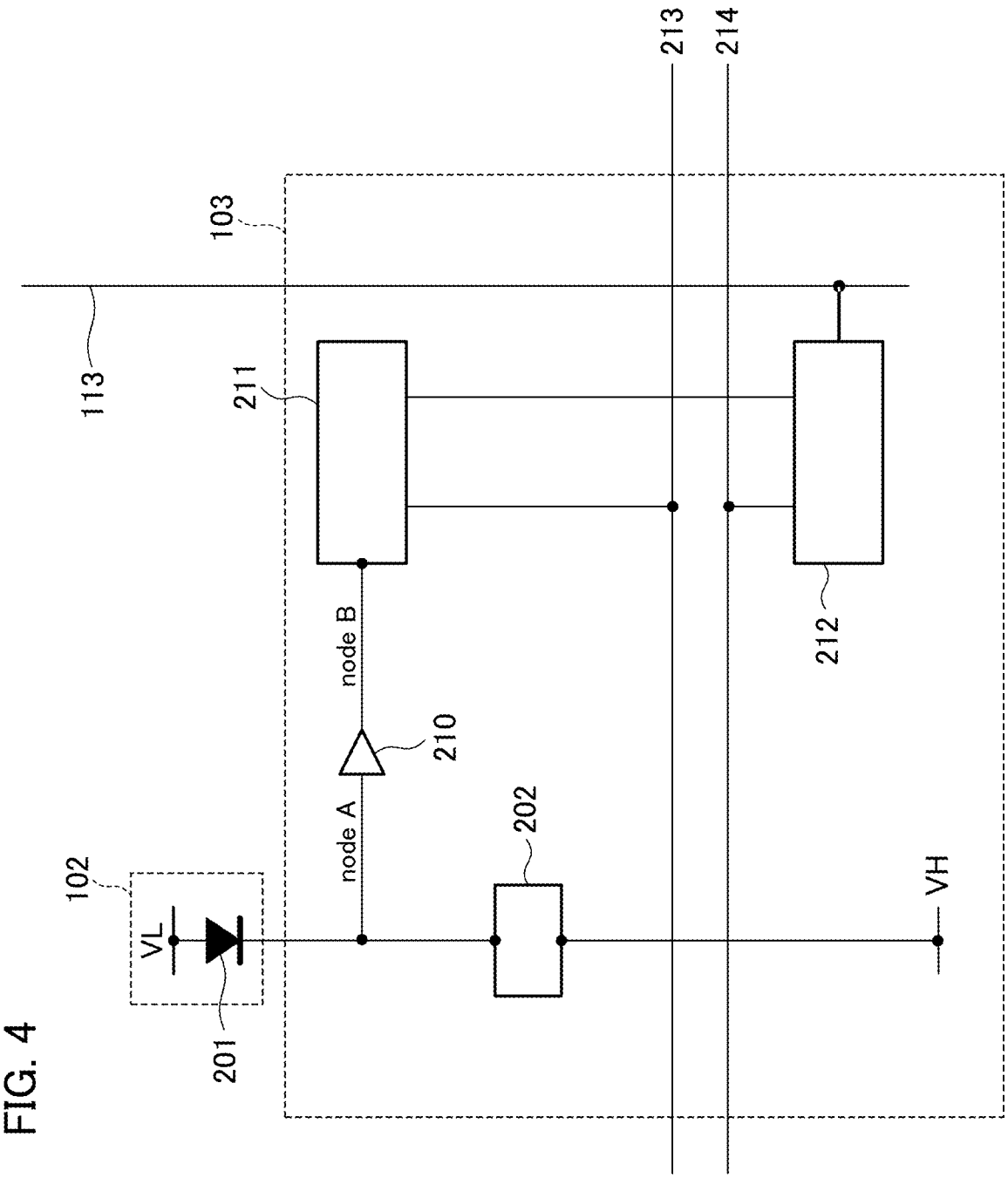
FIG. 4 is a diagram showing an equivalent circuit of a pixel 101 and a signal processing circuit 103 corresponding to the pixel 101 in FIG. 2 and FIG. 3.

FIG. 4 is a diagram showing the equivalent circuit of the pixel 101 and the signal processing circuit 103 corresponding to the pixel 101 in FIG. 2 and FIG. 3.

The APD 201 included in the photoelectric conversion unit 102 generates charge pairs in response to incident light through photoelectric conversion. One of the two nodes of the APD 201 is connected to the power line to which the drive voltage VL (first voltage) is supplied. Additionally, the other of the two nodes of the APD 201 is connected to a power line to which a drive voltage VH (second voltage) higher than the voltage VL is supplied.

In FIG. 4, one node of the APD 201 is the anode and the other node of the APD is the cathode. The anode and cathode of the APD 201 are supplied with reverse bias voltages such that the APD 201 operates with avalanche multiplication. In a state in which such voltages are supplied thereto, the charges generated by the incident light cause avalanche multiplication, and an avalanche current is generated.

Note that, in a case in which a reverse bias voltage is supplied, there is a Geiger mode in which the voltage difference between the anode and the cathode operates at a voltage difference that is higher than the breakdown voltage, and a linear mode in which the potential difference between the anode and the cathode operates at a voltage difference that is close to or lower than the breakdown voltage. An APD that operates in Geiger mode is referred to as a "SPAD". In the case of SPAD, the voltage VL (first voltage) is set to, for example, −30 V, and the voltage VH (second voltage) is set to, for example, 1V.

The signal processing circuit 103 has a quench element 202, a waveform shaping unit 210, a counter circuit 211, and a selection circuit 212. The quench element 202 is connected to the power line to which the drive voltage VH is supplied and one of the nodes of the anode and cathode of the APD 201.

The quench element 202 functions as a load circuit (quench circuit) when the signals are multiplied due to the avalanche multiplication, and has a function for controlling the voltage supplied to the APD 201 and controlling the avalanche multiplication (quench operation). Additionally, the quench element 202 works to return the voltage supplied to the APD 201 to the drive voltage VH (recharge operation) by flowing current to compensate for the voltage drop caused by the quench operation.

In FIG. 4, the signal processing circuit 103 is shown, for example, as having the waveform shaping unit 210, the counter circuit 211, and the selection circuit 212 in addition to the quench element 202. However, the signal processing circuit 103 need only have at least one of the waveform shaping unit 210, the counter circuit 211, and the selection circuit 212 in addition to the quench element 202.

The waveform shaping unit 210 shapes the voltage change in the cathode of the APD 201 that is obtained during photon detection, and outputs pulse signals. For example, an inverter circuit is used as the waveform shaping unit 210. Although FIG. 4 shows an example using a single inverter as the waveform shaping unit 210, a circuit with a plurality of inverters connected in series can be used, or any other circuit that has a waveform shaping effect can be used.

The counter circuit 211 counts the pulse signals that have been output from the waveform shaping unit 210, and holds the count value. Additionally, when the control pulse RES is supplied via a drive line 213, the signal held in the counter circuit 211 is reset.

The control pulse SEL is supplied from the vertical scanning circuit 110 in FIG. 3 to the selection circuit 212 via a drive line 214 (not illustrated in FIG. 3) in FIG. 4 to switch the electrical connection or disconnection between counter circuit 211 and the vertical signal line 113. The selection circuit 212 includes, for example, a buffer circuit and the like for outputting signals, and outputs output signals from the counter circuit 211 of the pixel to the vertical signal line 113.

Note that the electrical connection may be switched by disposing a switch such as a transistor between the quench element 202 and the APD 201, or between the photoelectric conversion unit 102 and the signal processing circuit 103. Similarly, the supply of voltage VH or voltage VL to the photoelectric conversion unit 102 may be electrically switched using a switch, for example, a transistor.

Figure 5:
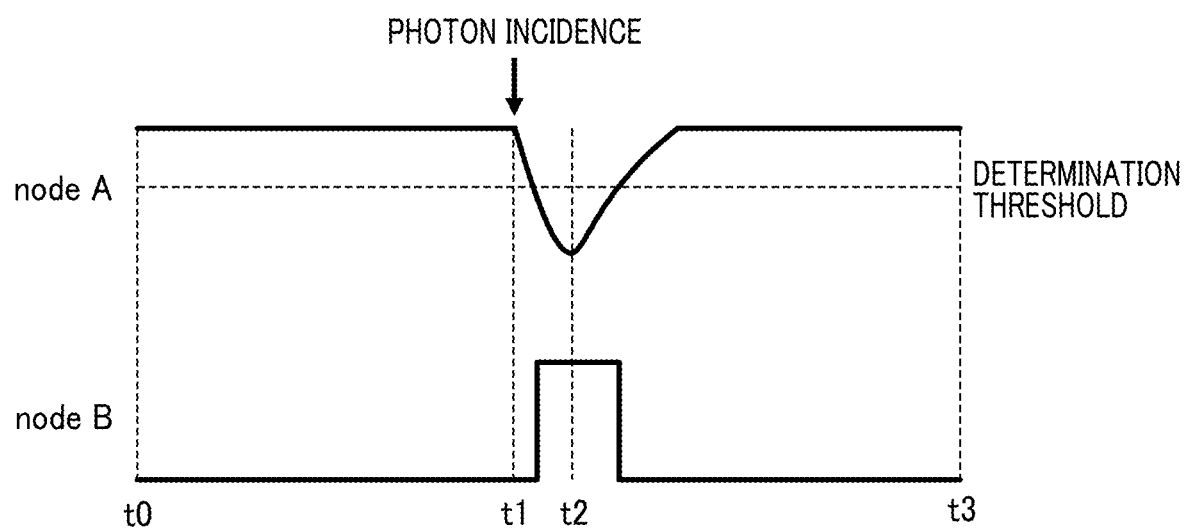
FIG. 5 is a schematic diagram showing the relation between the operation of an APD201 and the output signals.

FIG. 5 is a diagram schematically showing the relation between the operation of the APD 201 and the output signal. The input side of the waveform shaping unit 210 is denoted by node A, and the output side of the waveform shaping unit 210 is denoted by node B. Between timing t0 and timing t1, a potential difference of VH-VL is applied to the APD 201. When photons enter the APD 201 at timing t1, avalanche multiplication occurs in the APD 201, an avalanche multiplication current flows through the quenching element 202, and the voltage of the node A drops.

When an amount of the voltage drop becomes even larger and the potential difference applied to the APD 201 becomes smaller, the avalanche multiplication of the APD 201 stops as at timing t2, and the voltage level of node A does not drop to a certain value or less.

After that, during a period from timing t2 to timing t3, a current that compensates for a voltage drop from the voltage VL flows in the node A, and the node A is statically determinate to the original potential level at timing t3. At this time, a portion where the output waveform exceeds a certain threshold in the node A is waveform-shaped by the waveform shaping unit 210, and output as a pulse signal in the node B.

Figure 6:
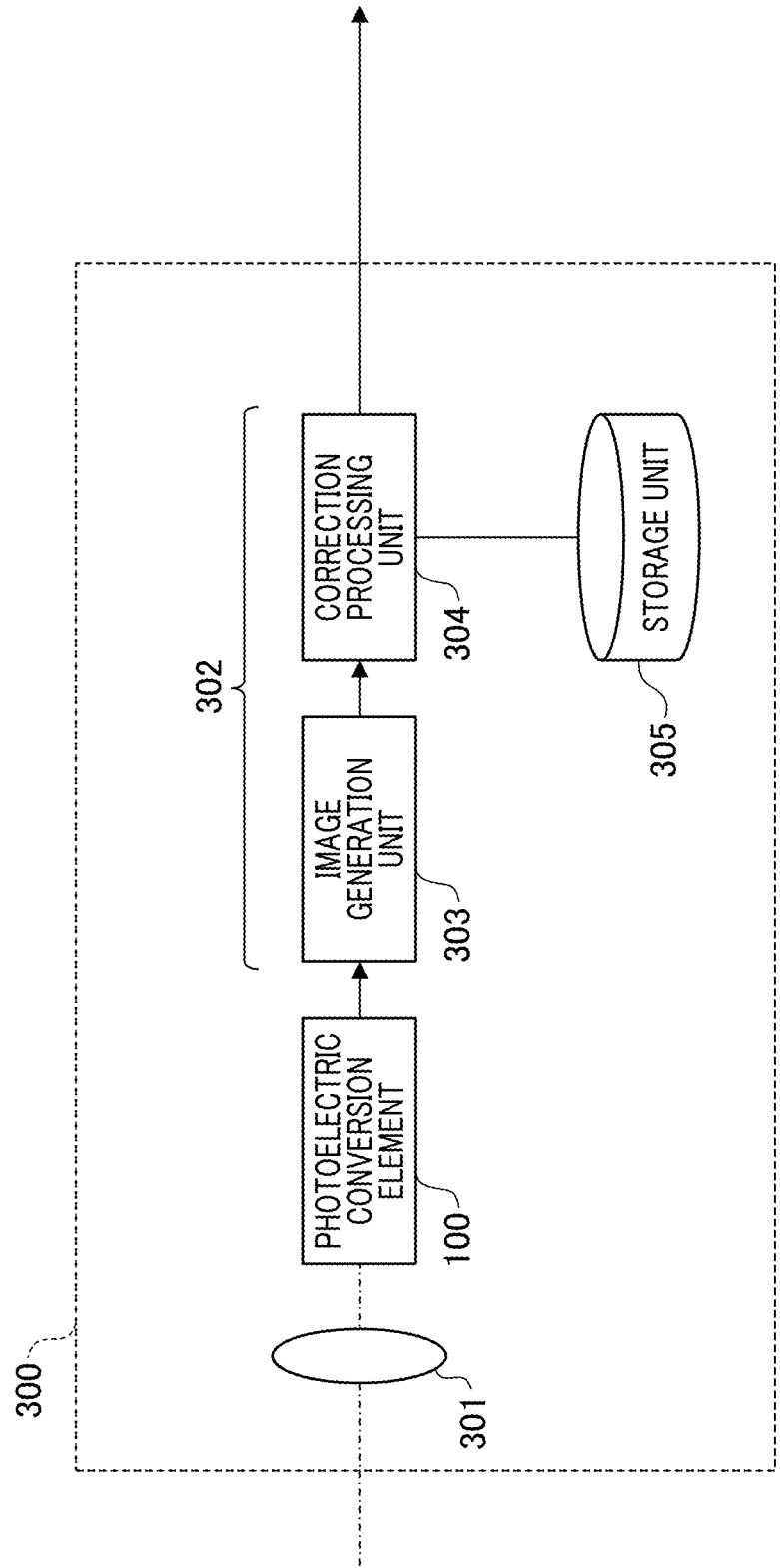
FIG. 6 is a functional block diagram of a photoelectric conversion device 300 according to the first embodiment.

The photoelectric conversion device 300 according to the first embodiment will be described below. FIG. 6 is a functional block diagram of the photoelectric conversion device 300 according to the first embodiment. Note that some of the functional blocks as shown in FIG. 6 are realized by causing a computer (not illustrated) included in the photoelectric conversion device 300 to execute a computer program that is stored in a memory serving as a storage medium (not illustrated).

However, a part or all of them may be realized by hardware. As the hardware, a dedicated circuit (ASIC), a processor (reconfigurable processor, DSP), and the like can be used. Additionally, the each of the functional blocks as shown in FIG. 6 need not be incorporated in the same housing, and may be configured by separate devices that are connected to each other via a signal path. Note that the above explanation regarding FIG. 6 is also similarly applied to FIG. 16.

The photoelectric conversion device 300 has the photoelectric conversion element 100 explained with reference to FIG. 1 to FIG. 5, an imaging optical system 301, and a signal processing unit 302 that processes an image signal that has been acquired by the photoelectric conversion element 100. The photoelectric conversion element 100 is configured by an avalanche photodiode for photoelectrically converting an optical image. Note that, in the first embodiment, a case in which each pixel of the photoelectric conversion element 100 is referred to as a monochrome sensor that does not have a color filter will be explained.

The signal processing unit 302 has an image generation unit 303 that generates a first image from a signal that has been acquired by the photoelectric conversion unit, a correction processing unit 304, and a storage unit 305 that stores first array data related to first characteristic information of the photoelectric conversion element 100.

Note that the above-described first characteristic information is information regarding crosstalk characteristics between pixels caused by the avalanche light emission phenomenon of the photoelectric conversion element 100. Note that the storage unit 305 may download the first characteristic information (first array data and the like) from an external server and the like, and temporarily store the first characteristic information.

The correction processing unit performs the first correction processing by using the first array data based on the first characteristic of the photoelectric conversion element 100, that is, the first characteristic information on the crosstalk characteristic between pixels generated by the avalanche light emission phenomenon of the photoelectric conversion element.

Note that, in the photoelectric conversion element of the first embodiment, the weighting of the first correction processing is changed for each pixel based on the information on the magnitude of the pixel signal in the first image. Note that the first characteristic information may be array data or a function.

Figure 7:
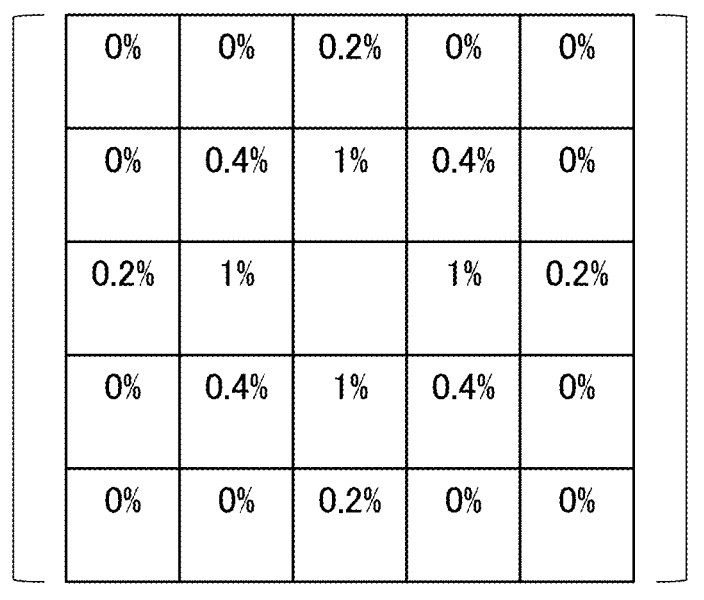

FIG. 7 is a diagram illustrating a probability distribution in which an erroneous count occurs between adjacent pixels of the photoelectric conversion element 100 as the first array data, and illustrates an example of the first array data corresponding to the first characteristic information of the photoelectric conversion element 100. The first array data (first characteristic information) as shown in FIG. 7 is stored in the storage unit 305, and the correction processing unit 304 performs the first correction processing by using this first array data (first characteristic information).

As described in non-patent document 1, in a case in which a pixel is an avalanche photodiode, erroneous counting in an adjacent pixel, that is, crosstalk between adjacent pixels (hereinafter, referred to as "light emission crosstalk") occurs due to an avalanche light emission phenomenon.

The influence of photons incident on one pixel on adjacent pixels is determined by the probability of occurrence of light emission crosstalk. Because the probability of occurrence of light emission crosstalk is determined by the pixel structure of the photoelectric conversion element, the probability of occurrence of light emission crosstalk can be predicted by the pixel structure of the photoelectric conversion element.

Therefore, in the photoelectric conversion device 300 according to the first embodiment, the quality of an image is improved by performing signal processing for suppressing the influence of erroneous counting by using information on the probability of occurrence of light emission crosstalk.

In particular, in the photoelectric conversion element in the first embodiment, the weighting (coefficient) to be applied to the first array data is changed between a defective pixel having a pixel signal larger than those of surrounding pixels in the first image and a pixel other than the defective pixel.

That is, the weighting of the first correction processing is changed by varying the weighting (coefficient) of the first correction processing depending on the magnitude of the pixel signal in the first image. Thereby, it is possible to suppress deterioration in image quality due to erroneous counting. Hereinafter, a flowchart of signal processing according to the first embodiment and effects thereof will be described.

Figure 8:
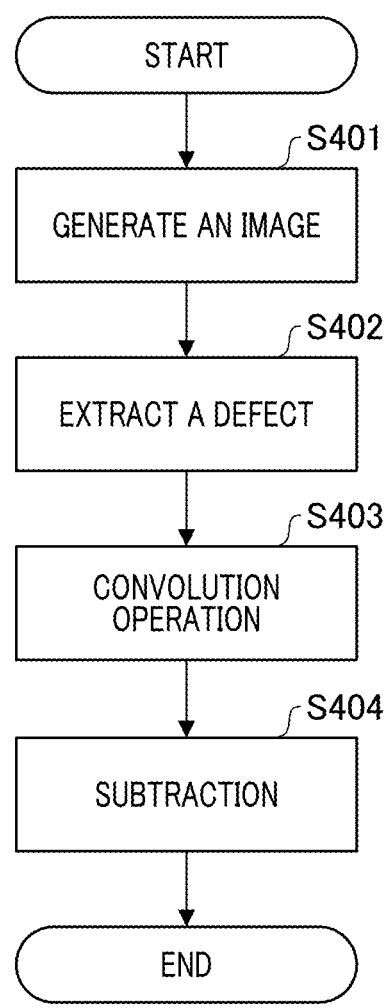
FIG. 8 is a flowchart related to the first correction processing of the photoelectric conversion device according to the first embodiment.

FIG. 8 is a flowchart related to the first correction processing performed by the photoelectric conversion device according to the first embodiment. Note that a computer in the photoelectric conversion device 300 executes a computer program that is stored in the memory to perform the operation of each step of the control method of the photoelectric conversion device as shown in the flowchart of FIG. 8.

According to the flow as shown in FIG. 8, in the correction processing unit 304, correction is performed on the defect pixels. As described above, in the case in which a pixel is an avalanche photodiode, the influence of a defective pixel propagates to surrounding pixels due to light emission crosstalk.

Such a defect is referred to as a cluster defect. The correction processing unit 304 improves the quality of an image by performing the signal processing for suppressing the influence of erroneous counting due to a cluster defect, by using information on the probability of occurrence of light emission crosstalk.

First, in step S401 (image generation step), the image generation unit 303 generates a first image based on a signal acquired by the photoelectric conversion unit 102. Next, in step S402, a pixel having a higher output level than surrounding pixels is extracted as a defective pixel from the first image that has been generated by the image generation unit 303.

It suffices if the position and level of a defective pixel may be obtained by acquiring a dark image in advance, storing the position and output level of a pixel having an output equal to or larger than a predetermined threshold as address data in a memory, for example, the storage unit 305, and using the address data.

Subsequently, in step S403, a first array data is obtained. At this time, the step S403 functions as an acquiring step (acquiring unit) for acquiring the first characteristic information of the photoelectric conversion element. In addition, in step S403, correction processing using the first array data is performed on the first image to generate a second image.

At this time, the weighting of the correction processing of the defective pixel is set lighter than the weighting of the correction processing of the pixels other than the defective pixel. Specifically, in the first correction processing, a convolution operation is performed on the first image by multiplying the first array data (first characteristic information) by the weighting coefficient K. At this time, the weighting coefficient K1 of the defective pixel is set to be smaller than the weighting coefficient K2 of the pixels other than the defective pixel.

Then, in step S404, the second image is subtracted from the first image to generate a third image. As described above, since the second image is a signal that represents an erroneous count caused by light emission crosstalk, the third image is an image obtained by restoring a signal obtained when an erroneous count caused by light emission crosstalk does not occur.

Here, the steps S403 and S404 function as a correction processing step (correction processing unit) of performing the first correction processing on the first image by using the first characteristic information such as the first array data. Furthermore, in the first correction processing, the weighting of the first correction processing is made different depending on the magnitude of the pixel signal in the first image, and it is possible to reduce the influence of the erroneous count that occurs due to the crosstalk of the defect.

Figure 9:
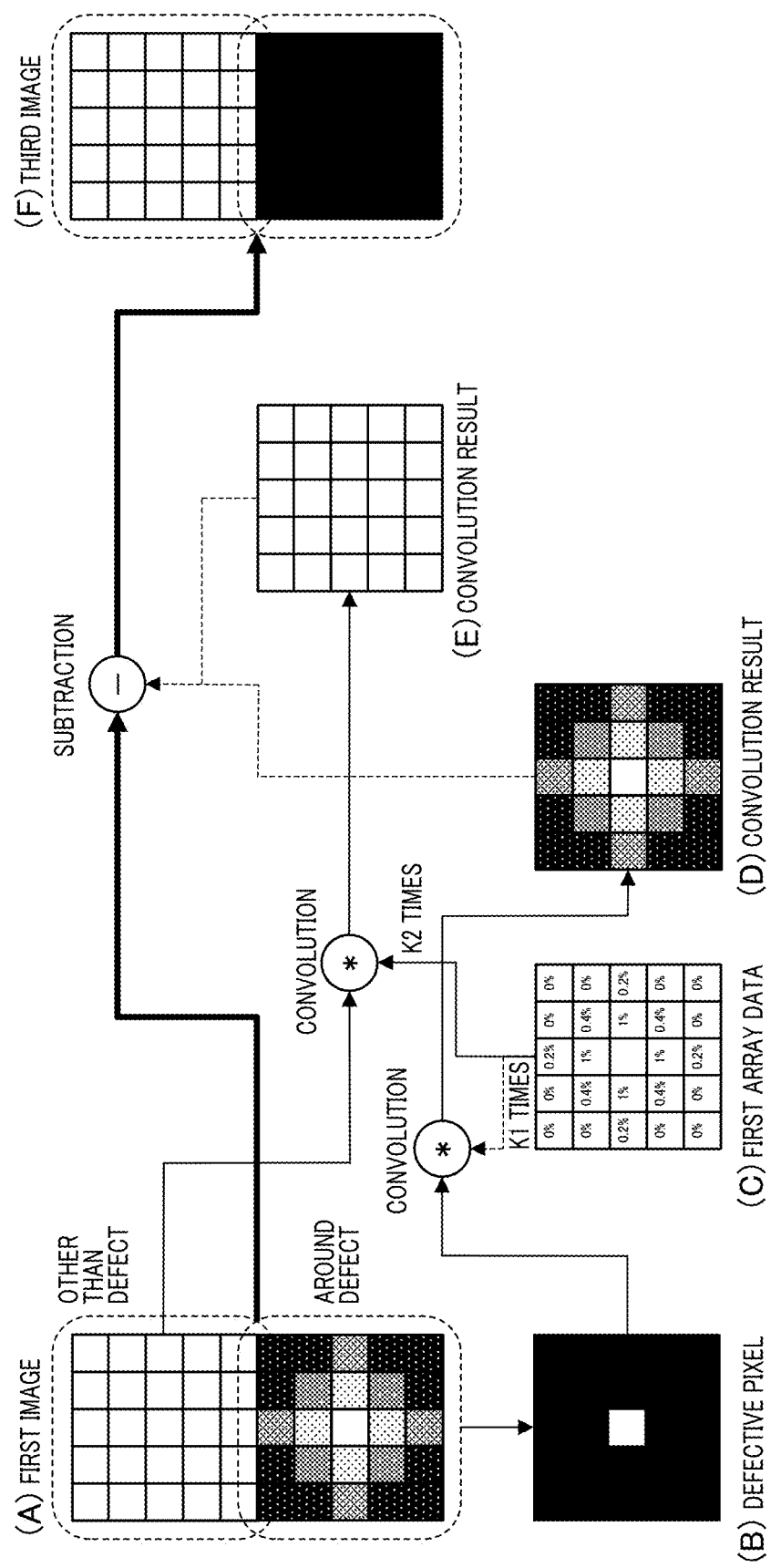
FIG. 9 is a diagram for explaining the first correction processing according to the first embodiment.

FIG. 9 is a diagram that explains the first correction processing according to the first embodiment, in which (A) illustrates a first image, (B) illustrates a defective pixel, (C) illustrates first array data, and (D) illustrates a convolution operation result with respect to the defective pixel. Additionally, (E) illustrates the convolution operation result of the pixels other than the defective pixel, and (F) shows the third image. (F), which is the third image, is the result of subtracting (D) and (E), which are the second images, from (A), which is the first image.

Note that in the example of FIG. 9, the 5×5 region in the lower half of (A), which is the first image, is originally a black screen. However, crosstalk occurs as shown in (A) due to a white flaw. However, it can be understood, in (F), which is the third image, obtained through the first correction processing, that the screen is restored to the original black screen.

Note that, only for the defective pixel in (B) that has been extracted in step S402, convolution operation is performed by multiplying the first array data by a weighting coefficient K1 in step S403, and convolution operation is performed by multiplying surrounding and neighboring pixels other than the defective pixel by a weighting factor K2.

Note that, although, as shown in FIG. 7, the first array data used as the first characteristic information may be one dimensional or two dimensional if it includes two or more pieces of data, it is preferably two dimensional array data.

Further, when the symmetry of the crosstalk probability is taken into consideration, it is preferable that both the rows and the columns are odd-numbered matrices, and that the upper, lower, left and right sides are symmetrical centered on the center. Since the value of the crosstalk probability increases as the pixel is closer, the crosstalk matrix has a distribution that has a peak value at the center and monotonically changes toward the periphery.

Specifically, when one row or one column of the crosstalk matrix, which is two dimensional array data, is extracted as one dimensional data, the crosstalk matrix has a distribution that monotonically decreases from a peak value at the center toward both data ends. That is, the one-dimensional data corresponding to at least one row or one column of the two-dimensional array data has a peak value at the center.

Then, other one-dimensional data that share the peak value of the extracted one-dimensional data and are arranged in the direction that intersects the one-dimensional data also have a monotonically decreasing distribution from the peak value toward the data edge.

Note that although FIG. 8 shows an example in which a defect is extracted by using an address data stored in advance in the memory in step S404, a defective pixel and its output level may be extracted from the first image. Specifically, a second image obtained by applying a median filter to the first image is generated.

In addition, a pixel having an output in which the difference between the first image and the second image is equal to or larger than the first threshold may be extracted as a defective pixel, and the difference between the first image and the second image may be set as the output level of the defective pixel. That is, a defective pixel may be extracted by comparing the output of each pixel of the first image to the output of surrounding pixels.

Extracting the defective pixel and the output level thereof from the first image is more preferable than using the address data since the configuration of the photoelectric conversion device 300 is simplified because a memory for storing the defective address is not required.

In contrast, in a case in which a defective pixel is extracted from the first image by using the median filter, when a subject such as a bright spot is captured, there is a possibility that the defective pixel is erroneously detected. Therefore, in order to accurately extract the defective pixel, it is preferable to use the address data. Note that although the case of using the median filter has been described above, the defective pixel may be extracted by comparing the output value of the pixel and the average output value of the surrounding pixels.

Next, the effect of the first embodiment will be explained in comparison to the case in which the first correction processing is performed on the defective pixel and the other pixels with the same weighting coefficient.

As described above, the probability of occurrence of light emission crosstalk can be predicted by the pixel structure of the photoelectric conversion element. However, due to the influence of manufacturing variations or the like, the probability of occurrence of light emission crosstalk is not necessarily the same for all pixels.

For example, in the case of a pixel having a small difference in output level with respect to surrounding pixels, the influence of the pixel on the surrounding pixels during the convolution operation and the influence of the surrounding pixels on the pixel are substantially the same, and thus, the influence due to the manufacturing variation is limited.

In contrast, a pixel having a higher output level than the surrounding pixels, that is, a defective pixel that causes a cluster defect, has a large influence on the surrounding pixels during convolution calculation, and thus, is largely influenced by the manufacturing variation.

That is, in a pixel in which the generation probability of the light emission crosstalk is low, the probability of the light emission crosstalk used during the convolution operation is higher than the actually generated light emission crosstalk, and thus, the a blackening occurs in the pixels around the cluster flaw.

In contrast, in a pixel in which the occurrence probability of the light emission crosstalk is high, the probability of the light emission crosstalk used during the convolution operation is lower than that of the light emission crosstalk that is actually occurring, and thus, the defect residue occurs in the pixels around the cluster defect.

In particular, when the blackening occurs, only the periphery of the defective pixel is blackened, so that a sense of discomfort is felt in human vision. Therefore, in the photoelectric conversion device of the first embodiment, the weighting coefficient K1 of the first array data to be convoluted into the defective pixel is made relatively small. That is, the weighting coefficient of the first correction processing is set to be smaller for the defective pixel than for the other pixels so that blackening phenomenon does not occur.

In contrast, for the first array data to be convoluted to pixels other than the defective pixel, the weighting coefficient K2 is made relatively large to suppress the erroneous count due to the light emission crosstalk of the defective pixel. Specifically, the weighting coefficient K1 of the defective pixel may be set to about 0.4 to 0.8 times the weighting coefficient K2 of the pixels other than the defective pixel.

Note that, in the convolution operation for the defective pixel, array data corresponding to a pixel having a low probability of occurrence of light emission crosstalk may be used by taking manufacturing variations into consideration. Here, for example, in a case in which a histogram of the occurrence probability is generated for each defective pixel, the low occurrence probability means the occurrence probability of, for example, 10% counted from the lowest occurrence probability. In contrast, in the convolution operation for pixels other than the defective pixel, array data corresponding to a pixel having an average probability of occurrence of light emission crosstalk may be used.

Figure 10:
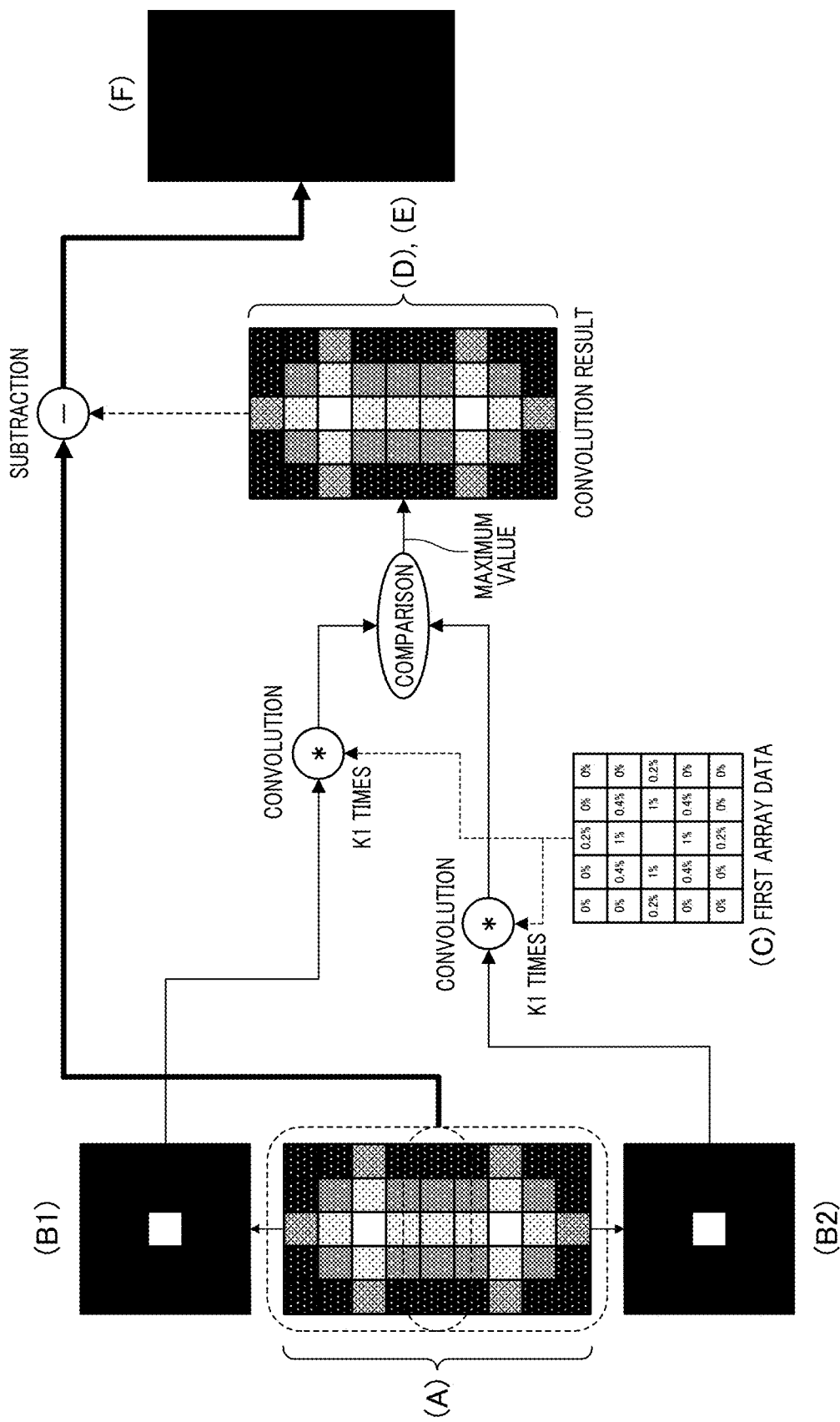
FIG. 10 is a diagram for explaining the first correction processing according to the first embodiment when a plurality of defective pixels are close to each other.

Note that FIG. 10 is a diagram for explaining the first correction processing according to the first embodiment when a plurality of defective pixels are close to each other. Although FIG. 10A, which is the first image, is originally a black screen on all sides, a white flaw in the center of the upper half and a white flaw in the center of the lower half have resulted in the image as shown in FIG. 10A.

When the results of the convolution operations on the plurality of defective pixels (B1) and (B2) are each subtracted from the pixels in the vicinity of the plurality of defective pixels, blackening phenomenon may occur due to excessive subtraction. Therefore, as shown in FIG. 10, for pixels in the vicinity of a plurality of defective pixels, results obtained by performing convolution operations on the plurality of defective pixels (B1) and (B2) using the same weighting coefficient K1 are compared.

Then, the larger convolution operation result is shared and used as the convolution operation results of the upper half and the lower half, and each of the convolution operation results (D) and (E) are each subtracted from the first image (A). That is, among the calculation results of the convolution calculation on the plurality of defective pixels, the larger calculation result is shared and used. As a result, the original black screen (F) can be obtained.

Although, in the above description, an example in which the weighting coefficient of the first correction processing is changed depending on whether the pixel is a defective pixel or not has been explained, the weighting coefficient may be changed more finely. That is, as the level of the defective pixel is larger, the influence on the surrounding pixels is larger. Therefore, the weighting coefficient of the first correction processing may be set to be smaller for the defective pixel having a larger difference in pixel signal from the surrounding pixels.

In addition, when a defect is extracted by using address data, the difference between pixel signals of surrounding pixels (defect level) may be stored in addition to the address of the defect, and a weighting coefficient corresponding to the defect level may be used.

In contrast, when a defective pixel and its output level are extracted from the first image, a weighting coefficient corresponding to the extracted output level may be used. In that case, the weighting coefficient may be reduced as the difference in the output level with respect to the surrounding pixels including both the defective pixel and the pixels other than the defective pixel increases.

The difference in output level with respect to the surrounding pixels may be obtained by, for example, subtracting a second image generated by applying a median filter to the first image from the first image. That is, as the difference between the first image and the second image is larger, the weighting coefficient may be set to be smaller.

Note that the photoelectric conversion element 100 may be a monochrome sensor having no on-chip color filter, or may be a color sensor having two or more kinds of pixels with different spectral characteristics. In the case of a color sensor, it is desirable to change the correction processing for each color.

Although, in the case of a color sensor, there is no difference in crosstalk probability between colors, since the signal level changes for each different color pixel depending on the color of the subject, there may be a case in which a color that is easily affected by erroneous counting due to crosstalk is present.

For example, in a case in which the photoelectric conversion element is a color sensor in which, for example, RGB color filters are arranged for each pixel, the luminance of the B pixel is the lowest and the luminance of the G pixel is the highest in a general subject. Therefore, the B pixel is most likely to be affected by erroneous counting due to crosstalk, and the G pixel is least likely to be affected.

As the size of the array data (first characteristic information) used for the convolution operation is larger, the influence of the erroneous count due to the crosstalk can be reduced. However, the influence of the difference in the light emission crosstalk probability due to the cluster defect or the manufacturing variation is easily received.

Therefore, it is desirable that the first array data have a minimum size that can suppress the influence of erroneous counting due to crosstalk. Therefore, when the photoelectric conversion element is a color sensor of an RGB Bayer array type or the like, it is desirable that the size of the array data (first characteristic information) used in step S502 is larger for the B pixel than for the G pixel.

Note that, in the case of a color sensor, it is desirable to change the size of the array data used in the convolution operation depending on whether the pixel is a defective pixel or not, in addition to changing the size of the first array data used as the first characteristic information for each pixel having different spectral characteristics. As described above, in the periphery of the defective pixel, it is desirable to reduce the weighting coefficient of the first correction processing in order to suppress the occurrence of blackening phenomenon.

Therefore, at the periphery of the defective pixel, there is a possibility that the color crosstalk correction is insufficient. In the defective pixel, the weighting coefficient is decreased and the size of the array data (first characteristic information) is increased, and consequently, it is possible to improve the accuracy of the color crosstalk correction while suppressing blackening phenomenon around the defective pixel. That is, it is desirable to increase the size of the first array data (first characteristic information) for a pixel having a larger difference in pixel signal from surrounding pixels.

Second Embodiment

Figure 11:
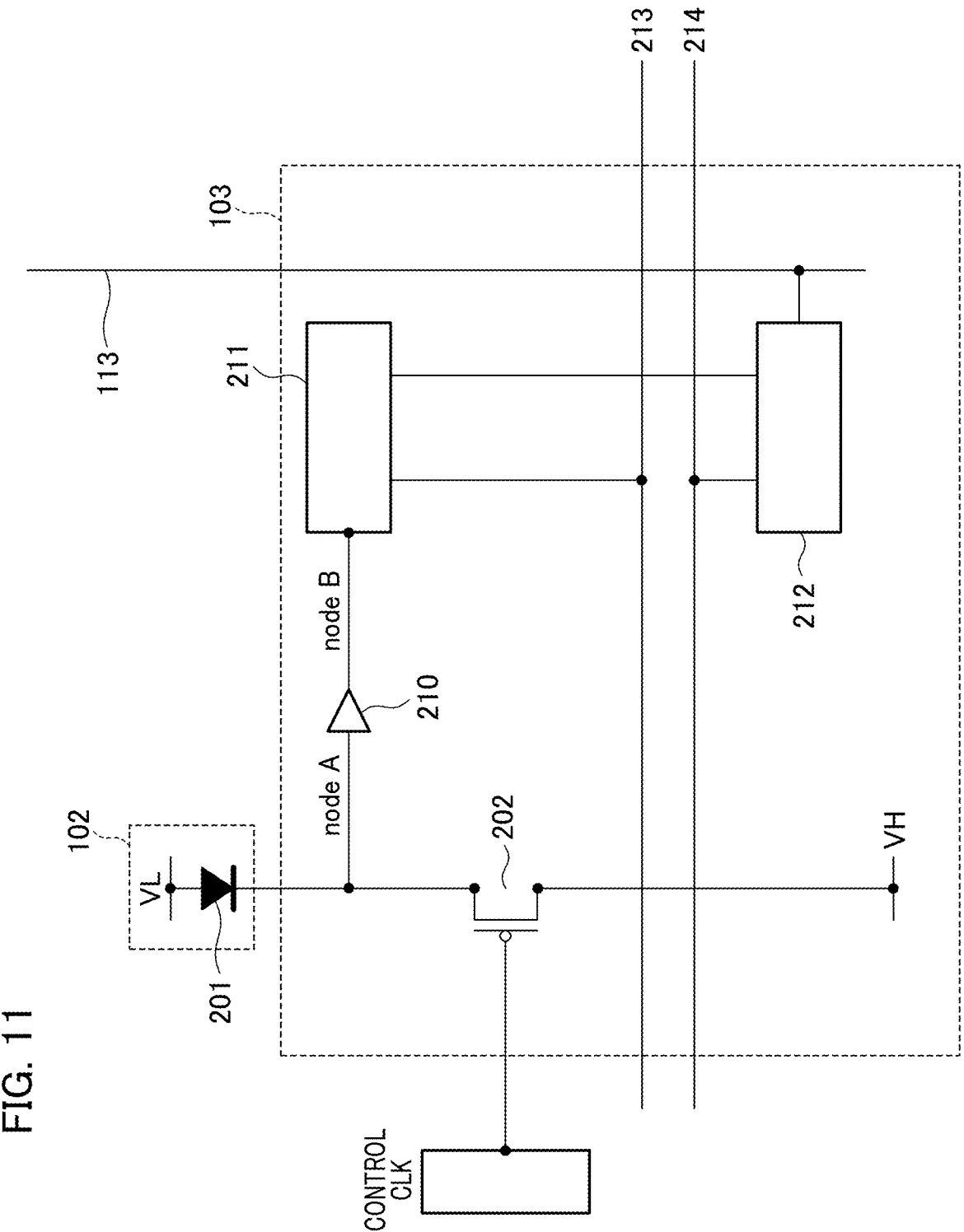
FIG. 11 is an equivalent circuit diagram corresponding to a pixel of a photoelectric conversion element according to the second embodiment.

The photoelectric conversion device according to the second embodiment is different from the photoelectric conversion device according to the first embodiment in the method for driving the photoelectric conversion element. FIG. 11 is an equivalent circuit diagram corresponding to a pixel of the photoelectric conversion element according to the second embodiment.

As shown in FIG. 11, the quench element 202 is configured by a MOS transistor, and the on/off of the quench element 202 (MOS transistor) is controlled by a control signal CLK that is connected to the gate of the MOS transistor. The control signal CLK for controlling the operation of the quenching element is supplied from the control pulse generation unit 115 serving as a signal generation unit.

Figure 12:
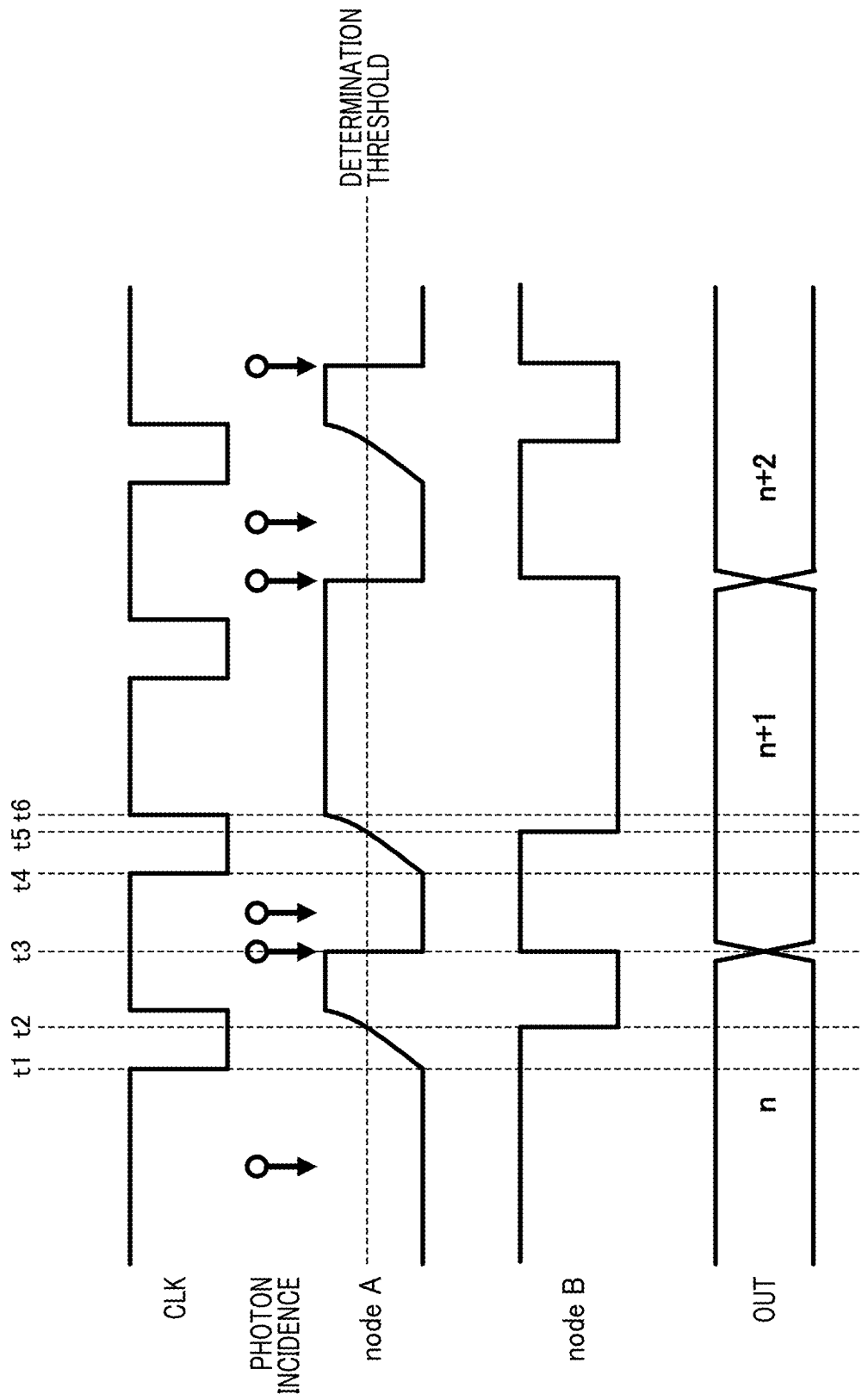
FIG. 12 is a driving timing chart of the photoelectric conversion element according to a second embodiment.

FIG. 12 is a drive timing chart of the photoelectric conversion element according to the second embodiment. FIG. 12 shows the relation among the control signal CLK of the quenching element 202, the voltage of the node "nodeA", the voltage of the node "nodeB", and the output signal OUT of the selection circuit 212 in the photoelectric conversion element as shown in FIG. 11.

In the photoelectric conversion element of the second embodiment, when the control signal CLK is at a high level (for example, 1V), it becomes a state in which the driving voltage VH is not easily supplied to the APDs, and when the control signal CLK is at a low level (for example, 0V), it becomes a state in which the driving voltage VH is supplied to the APDs. When the control signal CLK is at a high level, the quench element 202 is turned off, and when the control signal CLK is at a low level, the quench element 202 is turned on.

The resistance value of the quench element 202 when the control signal CLK is at a high level is higher than the resistance value of the quench element 202 when the control signal CLK is at a low level. Therefore, when the control signal CLK is at a high level, even if avalanche multiplication occurs in the APD, a recharge operation is not easily performed, and thus, the voltage supplied to the APD becomes a voltage equal to or lower than the breakdown voltage of the APD. Therefore, the avalanche multiplication operation in the APD is stopped.

At timing t1, the control signal CLK changes from the high level to the low level, the quenching device 202 is turned on, and the recharging operation of the APDs is started. As a result, the voltage of the cathode of the APD transitions to a high level. In addition, it is in a state in which the voltage difference between the voltages applied to the anode and the cathode of the APD becomes a state in which avalanche multiplication is possible.

The voltage of the cathode is the same as that of the node "node A". Therefore, when the voltage of the cathode transitions from the low level to the high level, the voltage of the node "nodeA" becomes equal to or higher than the determination threshold at timing t2. At this time, the pulse signal output from the node "nodeB" is inverted from a high level to a low level.

When the recharging is completed, it is in a state in which a voltage difference between the driving voltage VH and the driving voltage VL is applied to the APD 201. Thereafter, the control signal CLK becomes a high level, and the quenching element 202 is turned off.

Next, at timing t3, when photons enter the APD 201, avalanche multiplication occurs in the APD 201, an avalanche multiplication current flows to the quenching device 202, and the voltage of the cathode drops. That is, the voltage of the node "node A" drops. When the voltage of the node "node A" becomes lower than the determination threshold while the voltage of the node "node A" is dropping, the voltage of the node "node B" changes from the low level to the high level.

Specifically, the portion of the output waveform that exceeds a determination threshold at the node "node A" is waveform-shaped by the waveform shaping unit 210, and output as a pulse signal at node B. Then, the count value of the counter signal counted by the counter circuit and output from the counter circuit increases by 1 LSB.

Although photons are incident on the APDs between timing t3 and timing t4, the voltage level of the node "nodeA" does not exceed a determination threshold because the quenching element 202 is in the off state and the voltage applied to the APD 201 does not have a voltage difference that enables avalanche multiplication.

At timing t4, the control signal CLK changes from the high level to the low level, and the quenching device 202 is turned on. Accordingly, a current that compensates for the voltage drop from the drive voltage VL flows to the node "nodeA", and the voltage of the node "nodeA" transitions to the original voltage level. At this time, since the voltage of the node "nodeA" becomes equal to or higher than the determination threshold at timing t5, the pulse signal of the node "nodeB" is inverted from the high level to the low level.

At timing t6, the node "nodeA" stabilizes at the original voltage level, and the control signal CLK changes from the low level to the high level. Thereafter, as explained from timing t1 to timing t6, the voltage of each node, signal line, and the like changes according to the control signal CLK and the incidence of photons.

As described above, the control signal CLK is applied to the quench element 202 to switch on and off the quench element 202 at a predetermined cycle, thereby controlling the recharge frequency of the APD.

When the control signal CLK is not used, there is a concern that the actual count value becomes smaller than the count value corresponding to the luminance of the incident light when luminance is high. However, this concern can be solved by periodically switching on and off the quenching element 202 by applying the control signal CLK to the quenching element 202.

However, when the recharge frequency of the APD is controlled by the control signal CLK, the relation between the number of input signals and the number of output signals is nonlinear. However, when the influence of light emission crosstalk is ignored, the relation between the number of input signals and the number of output signals can be theoretically derived. Specifically, when the number of input signals is denoted by "Nph", the number of output signals is denoted by "Nct", the frequency of the control signal CLK (the reciprocal of the number of CLKs per unit time) is denoted by "f", and the length of the exposure period is denoted by "T", Formula 1 below is satisfied.

$$Nct = fT\left(1 - e^{-\frac{Nph}{fT}}\right) \quad \text{[Formula 1]}$$

The photoelectric conversion device according to the second embodiment performs correction processing in which the influence of a non-linear response caused by the control signal CLK and the influence of erroneous counting caused by crosstalk can be simultaneously reduced. An explanation will be provided below.

Figure 13:
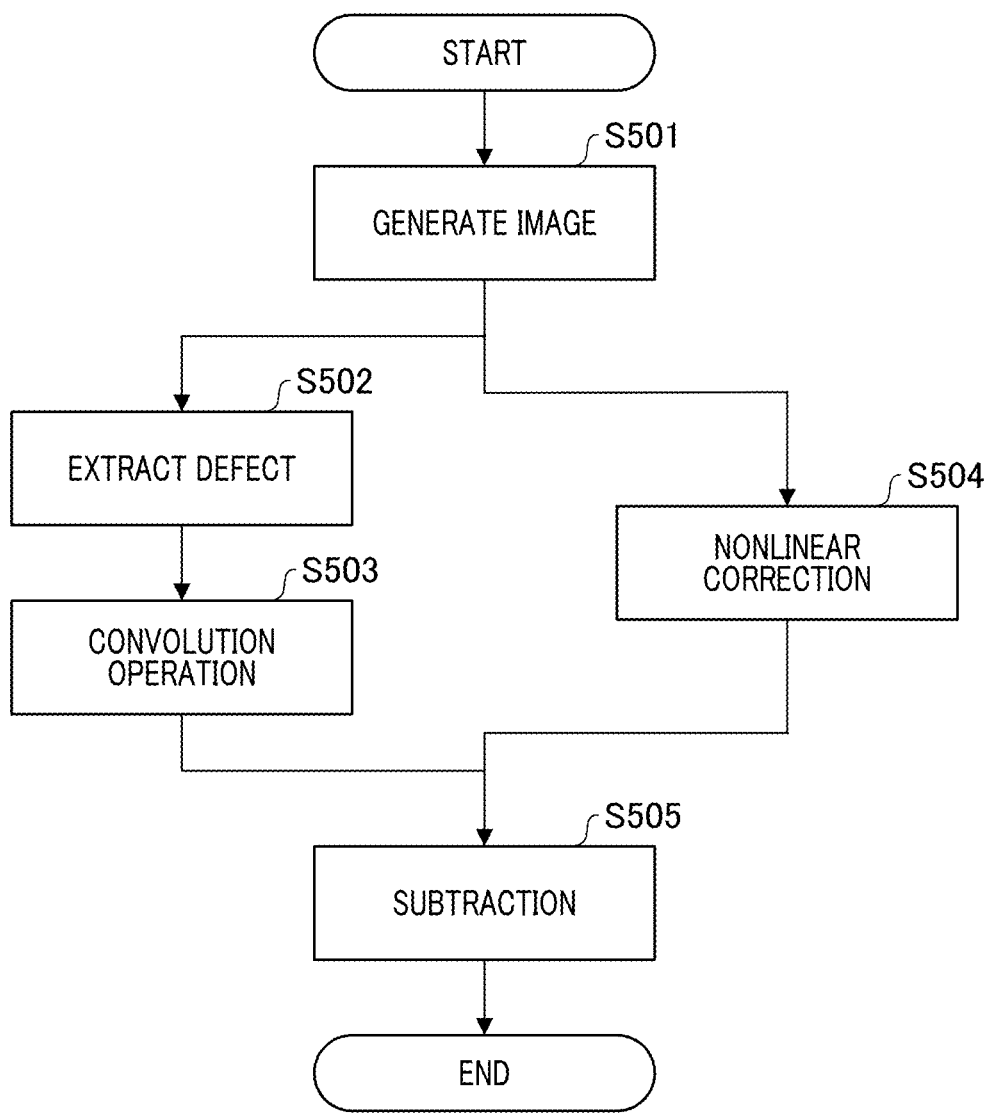
FIG. 13 is a flowchart of the signal processing of the photoelectric conversion device according to the second embodiment.

FIG. 13 is a flowchart of signal processing of the photoelectric conversion device according to the second embodiment. Note that the computer in the photoelectric conversion device 300 executes a computer program stored in the memory to perform the operation of each step in the flowchart of FIG. 13.

Hereinafter, portions that differ from the flowchart of FIG. 8 will be mainly described. First, in step S501, as in step S401, the image generation unit 303 generates a first image, and in step S502, as in step S402, defective pixels are extracted.

Next, in step S503, as in step S403, for the first image, convolution operation is performed on the first array data to generate the second image. At this time, the weighting of the convolution operation of the defective pixel is made lighter than the weighting of the convolution operation of the pixels other than the defective pixel.

In the photoelectric conversion device of the second embodiment, after step S501, the process branches to step S502 and 503, and the signal processing (second correction processing) in step S504 is performed.

In step S504, nonlinearity correction processing for returning a nonlinear response generated by the control signal CLK to a linear response (correcting nonlinearity) is performed on the first image to generate a third image. Specifically, the number of input signals Nph is obtained from the number of output signals Nct so as to satisfy the following Formula 2.

$$Nph = -fT \times \ln\left(\frac{1 - Nct}{fT}\right) \quad \text{[Formula 2]}$$

Subsequently, in step S505, the second image is subtracted from the third image to generate a fourth image. That is, in the first correction processing, the fourth image is generated by subtracting the second image that has been generated by convolving the first array data on the first image from the third image that has been generated by performing the nonlinearity correction processing on the first image.

As described above, since the second image is a signal representing an erroneous count caused by light emission crosstalk, the fourth image is an image obtained by restoring a signal obtained when an erroneous count caused by light emission crosstalk does not occur.

Thus, it is possible to simultaneously reduce the influence of the non-linear response generated by the control signal CLK and the influence of the erroneous count generated by the crosstalk by the processes of steps S503 to S505.

Figure 14:
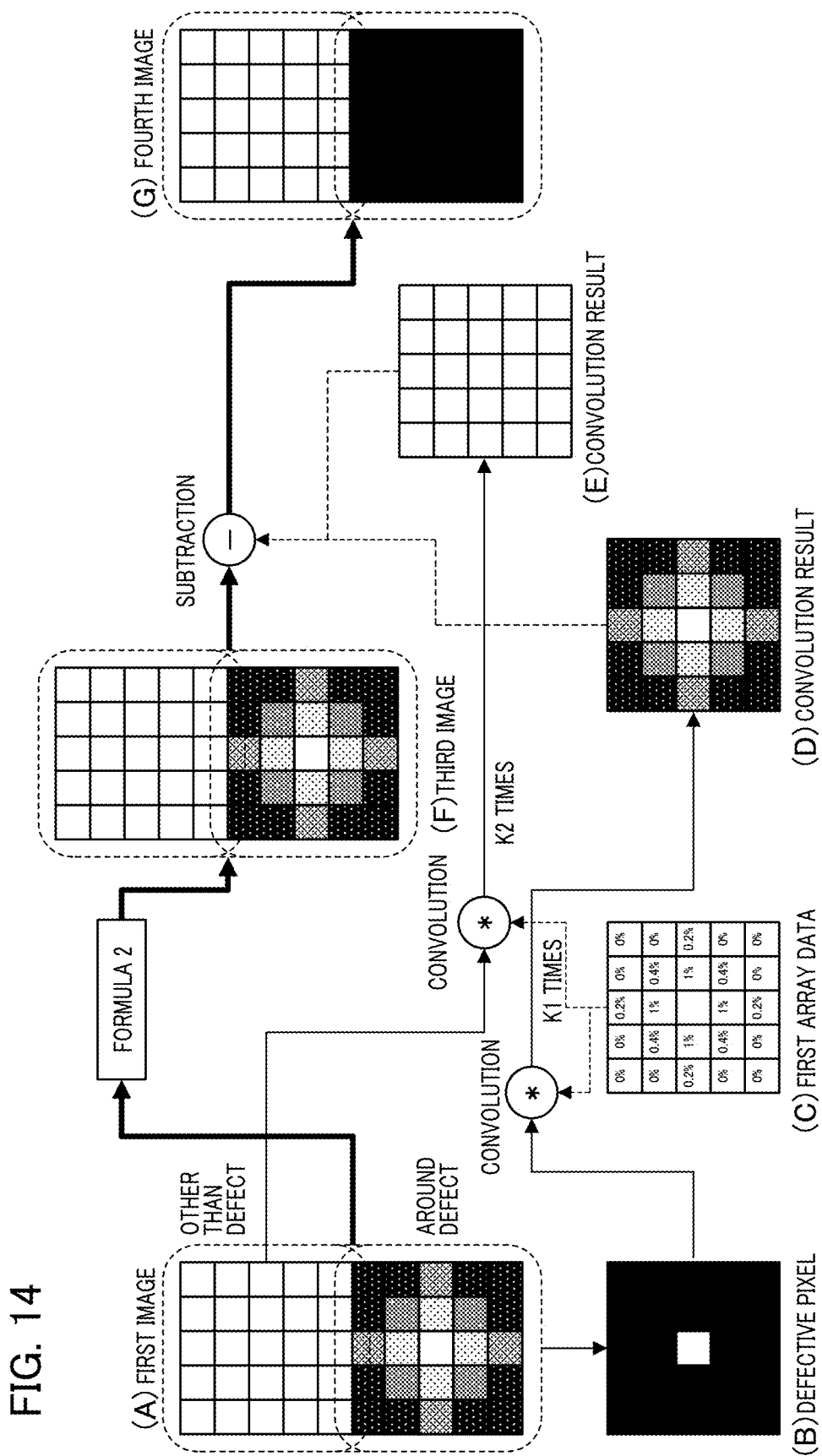
FIG. 14 is a diagram for explaining the first correction processing according to the second embodiment.

FIG. 14 is a diagram that explains the first correction processing according to the second embodiment, in which (A) illustrates the first image, (B) illustrates the defective pixel, (C) illustrates the first array data, and (D) illustrates the convolution operation result with respect to the defective pixel. Additionally, (E) shows the convolution operation result with respect to the pixels in the upper half of the first image, (F) shows the third image, and (G) shows the fourth image.

Third Embodiment

The photoelectric conversion device according to the third embodiment is different from the photoelectric conversion device according to the second embodiment on the point that the signal processing unit 302 includes a gain adjustment unit (not illustrated) that applies a gain to the first image.

In general, in a photoelectric conversion device that obtains an image, an exposure time, an F-number of an imaging optical system, a gain of a signal processing circuit (hereinafter, referred to as a "signal gain"), and the like are changed depending on the brightness of a subject, and image capturing is performed so that the luminance of the subject becomes appropriate.

In the photoelectric conversion device according to the third embodiment, when the value of the signal gain is changed in order to adjust the brightness, the parameters of the first correction processing and the second correction processing are changed accordingly.

Figure 15:
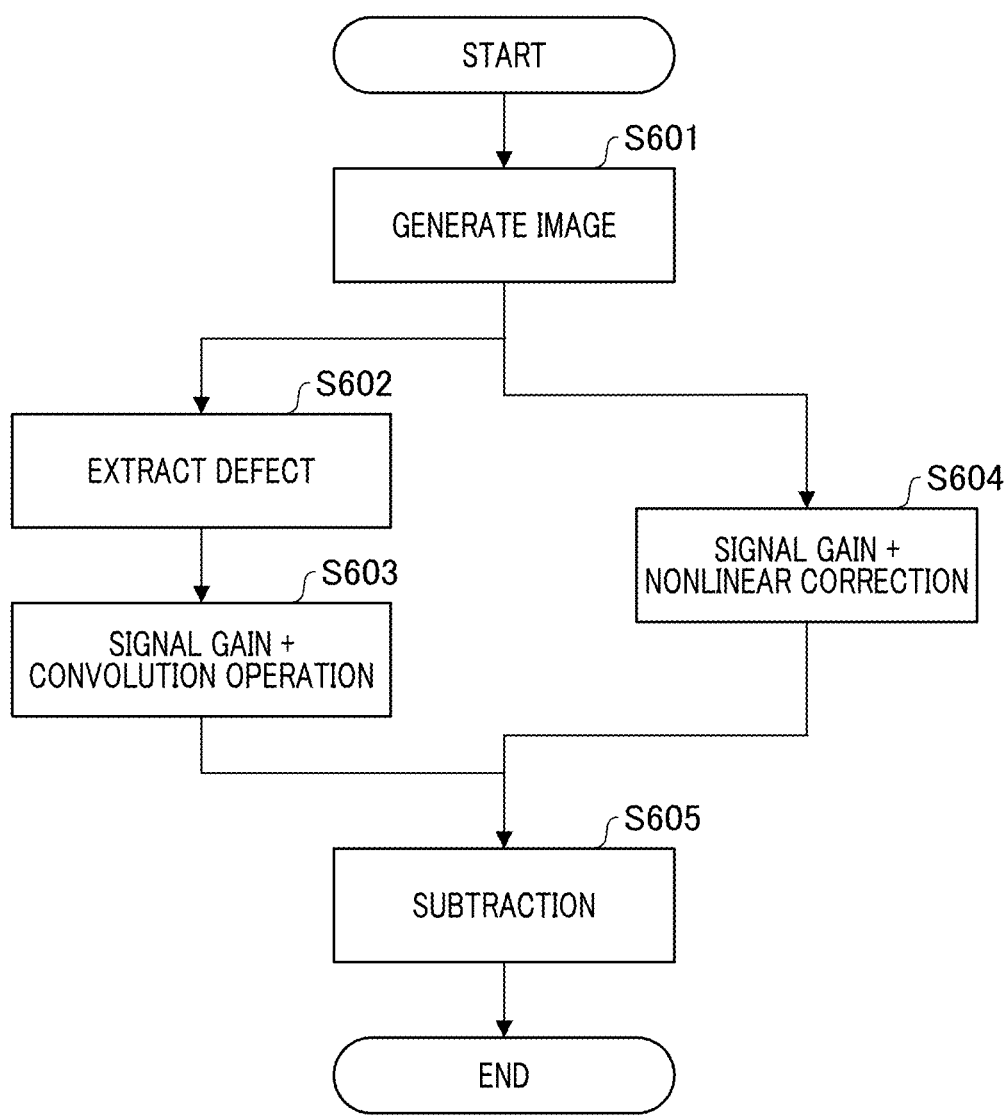
FIG. 15 is a flowchart of the signal processing of the photoelectric conversion device according to the third embodiment.

FIG. 15 is a flowchart of signal processing of the photoelectric conversion device according to the third embodiment. Note that the computer in the photoelectric conversion device 300 executes a computer program stored in the memory to perform the operation of each step in the flowchart of FIG. 15.

The portions that differ from the flowchart of FIG. 14 will be mainly described below. In step S601, the image generation unit 303 generates a first image, and in step S602, defective pixels are extracted.

Next, in step S603, a signal gain is applied to the first image by a gain adjustment unit (not illustrated), and then the correction processing (convolution operation) using the first array data is performed on the first image to generate a second image.

The first array data, which is generated based on the luminescence crosstalk probability, often has a fractional value. Since the output of the image is generally an integer, the influence of the quantization error can be suppressed, and the correction accuracy can be improved by performing the gain adjustment on the first image during the convolution operation. Note that the same signal gain (hereinafter, referred to as a "first gain") as that applied in step S603 is also used in step S604.

In step S604, the first gain is similarly applied to the first image, and nonlinearity correction processing for returning a non-linear response generated by the control signal CLK to a linear response is performed to generate a third image.

Since Formula 2 is a calculation including logarithms, fractional precision is required. Therefore, in the third embodiment, when the nonlinearity correction processing for returning the nonlinear response to the linear response is performed, the influence of the quantization error can be suppressed, and the correction accuracy can be improved by applying the first gain to the image.

Note that, in step S604, the number of input signals Nph may be obtained from the number of outputs signals Nct by mounting a processing circuit that calculates Formula 2, or a lookup table having the characteristics of Formula 2 may be used. In the case of using a look-up table, it is preferable to use a look-up table in which the first gain and the processing for returning to linearity are combined because a quantization error can be reduced. Then, in step S605, the second image is subtracted from the third image to generate a fourth image.

As described above, in the case of the photoelectric conversion device having the gain adjustment unit that adjusts signal gains, it is desirable to change the parameters of the first correction processing and the like according to the value of the signal gain. When the response has nonlinearity due to the control signal CLK, the influence of crosstalk increases as the number of output signals Nct decreases.

Therefore, it is preferable to increase the size of the first array data (first characteristic information) used in the convolution operation or to increase the weighting coefficient of the convolution operation as the brightness of the object is lower and the value of the signal gain applied to adjust the brightness is higher. In other words, it is desirable that, as the value of signal gain applied in the gain adjustment unit becomes higher, the weighting coefficient of the correction process is made larger.

Additionally, the value of the frequency f of the control signal CLK may also be changed according to the value of the signal gain. As can be seen from Formula 1, since the saturation level of Nct is proportional to f×T, if the length T of the exposure time is the same, the frequency f of the control signal CLK and the saturation level of Nct are proportional to each other. Therefore, it is desirable that, as the frequency f of the control signal CLK becomes lower, the value of the signal gain is made larger and the brightness is made brighter.

Since Formula 2 depends on the frequency f of the control signals CLK, it is desirable to change the nonlinearity correction processing in step S604 depending on the frequency f. In the case of using the look-up table having the characteristic of Formula 2, different look-up tables may be used depending on the frequency f of the control signal CLK.

As can be seen from Formula 1, if the length T of the exposure time is the same, as the frequency f of the control signal CLK becomes lower, the response becomes more nonlinear, and consequently, the influence of crosstalk increases. Therefore, as the frequency f becomes lower, it is preferable to increase the size of the first array data used for the convolution operation or to increase the weighting coefficient of the convolution operation. That is, it is desirable to increase the weighting coefficient of the first correction processing as the frequency f of the control signal becomes lower.

Fourth Embodiment

Figure 16:
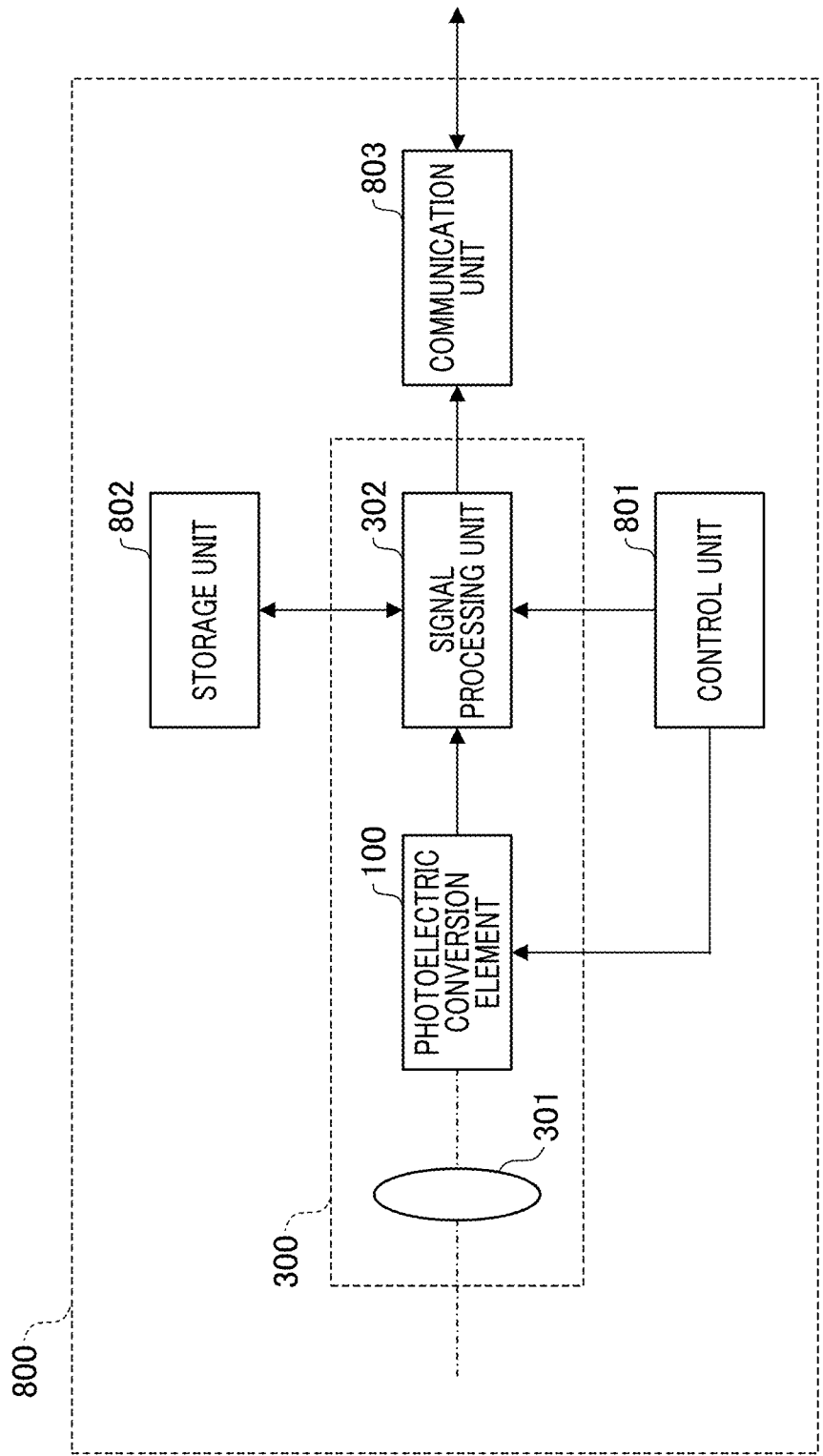
FIG. 16 is a functional block diagram of a photoelectric conversion system according to the fourth embodiment using the photoelectric conversion device of the first embodiment to the fourth embodiment.

FIG. 16 is a functional block diagram of a photoelectric conversion system according to the fourth embodiment using the photoelectric conversion devices according to the first embodiment to the third embodiment. A photoelectric conversion system 800 includes a photoelectric conversion device 300 including the photoelectric conversion element 100, a control unit 801, a storage unit 802, and a communication unit 803.

The photoelectric conversion element 100 captures an optical image formed by the imaging optical system 301. In the signal processing unit 302, in addition to image generation and correction processing, the processing such as black level correction, gamma curve adjustment, noise reduction, and data compression is performed on the signal that has been read out from the photoelectric conversion element 100, and a final image is generated. In the case in which the photoelectric conversion element 100 includes an RGB on-chip color filter, it is more preferable to perform processing such as white balance correction and color conversion.

Note that the control unit 801 has a built-in a CPU serving as a computer, and controls the operation of each unit of the entire photoelectric conversion system 800 based on a computer program stored in a memory serving as a storage medium. Additionally, the control unit 801 controls the length of the exposure period of each frame of the photoelectric conversion element 100 and the timing of the control signal CLK via the control pulse generation unit of the photoelectric conversion element 100.

The storage unit 802 includes a recording medium such as a memory card and a hard disk. The communication unit 803 includes a wireless or wired interface, outputs a generated image to the outside of the photoelectric conversion system 800, and receives a signal from the outside.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the photoelectric conversion device through a network or various storage media. Then, a computer (or a CPU, an MPU, or the like) of the photoelectric conversion device may be configured to read and execute the program. In such a case, the program and the storage medium storing the program configure the present disclosure.

Additionally, the present invention includes those is realized by using, for example, at least one processor or circuit configured to function of the embodiments explained above. Note that a plurality of processors may be used to perform distributed processing.

This application claims the benefit of Japanese Patent Application No. 2022-154574, filed on Sep. 28, 2022, which is hereby incorporated by reference herein in its entirety.

What is claimed is:

1. A photoelectric conversion device comprising:
   a photoelectric conversion element including an avalanche photodiode for photoelectrically converting an optical image; and
   at least one processor or circuit configured to function as:
   an image generation unit configured to generate a first image based on a signal acquired by the photoelectric conversion element;
   an acquisition unit configured to acquire first characteristic information of the photoelectric conversion element; and a correction processing unit configured to perform first correction processing on the first image by using the first characteristic information, wherein, in the correction processing unit, a weighting coefficient of the first correction processing is made different according to a magnitude of a pixel signal in the first image, and wherein the first correction processing includes processing of extracting a defective pixel in the first image, and the weighting coefficient of the first correction processing is changed between the defective pixel and other pixels.

2. The photoelectric conversion device according to claim 1, wherein the first characteristic information is two-dimensional array data, and one-dimensional data corresponding to at least one row or one column of the two-dimensional array data has a peak value at the center.

3. The photoelectric conversion device according to claim 1, wherein the weighting coefficient of the first correction processing is smaller for the defective pixel than for other pixels.

4. The photoelectric conversion device according to claim 3, wherein the weighting coefficient of the first correction processing is set to be smaller for the defective pixel having a larger difference in pixel signal with respect to surrounding pixels.

5. The photoelectric conversion device according to claim 1, wherein, in the processing of extracting the defective pixel, the defective pixel is extracted by comparing an output of each pixel of the first image and outputs of surrounding pixels.

6. The photoelectric conversion device according to claim 1, wherein the first correction processing includes processing of performing a convolution operation on the first image by multiplying the first characteristic information by a weighting coefficient.

7. The photoelectric conversion device according to claim 6, wherein the first correction processing includes processing of extracting a defective pixel having a pixel signal larger than those of surrounding pixels in the first image, and the larger one of the calculation results of the convolution operation for the plurality of defective pixels is used in share.

8. The photoelectric conversion device according to claim 1, wherein the photoelectric conversion element includes a quenching element connected to a power supply line and one of an anode and a cathode of the avalanche photodiode, and a signal generation unit configured to supply a control signal for controlling an operation of the quenching element.

9. The photoelectric conversion device according to claim 8, wherein the first correction processing corrects nonlinearity so as to satisfy the following formula, where f is a frequency of the control signal, T is a length of an exposure time, Nph is the number of input signals, and Nct is the number of output signals, $$Nph = -fT \times \ln\left(\frac{1 - Nct}{fT}\right).$$

10. The photoelectric conversion device according to claim 9, wherein the first correction processing includes processing of performing nonlinear correction processing on the first image.

11. The photoelectric conversion device according to claim 1, wherein the at least one processor or circuit is further configured to function as:
a gain adjustment unit configured to apply a gain to the first image.

12. The photoelectric conversion device according to claim 11, wherein a weighting coefficient of the first correction processing is increased as a value of a signal gain applied by the gain adjustment unit is higher.

13. The photoelectric conversion device according to claim 12, further comprising a quenching element in which the photoelectronic conversion device is connected to a power supply line and to one of an anode and a cathode of the avalanche photodiode, wherein the at least one processor or circuit is further configured to function as:
a signal generation unit configured to supply a control signal for controlling an operation of the quenching element, and wherein a value of the gain applied in the gain adjustment unit is increased as a frequency of the control signal is lower.

14. The photoelectric conversion device according to claim 13, wherein weighting of the first correction processing is increased as a frequency of the control signal is lower.

15. The photoelectric conversion device according to claim 1, wherein the first characteristic information relates to a crosstalk characteristic between pixels caused by an avalanche light emission phenomenon.

16. A control method for controlling a photoelectric conversion device having a photoelectric conversion element including an avalanche photodiode for photoelectrically converting an optical image, the control method comprising:
generating a first image based on a signal acquired by the photoelectric conversion element;
acquiring first characteristic information of the photoelectric conversion element; and
performing correction processing including first correction processing on the first image by using the first characteristic information,
wherein, in the correction processing, a weighting coefficient of the first correction processing is made different depending on a magnitude of a pixel signal in the first image, and
wherein the first correction processing includes processing of extracting a defective pixel in the first image, and the weighting coefficient of the first correction processing is changed between the defective pixel and other pixels.

17. A non-transitory computer-readable storage medium storing a computer program to control a photoelectric conversion device having a photoelectric conversion element including an avalanche photodiode for photoelectrically converting an optical image, wherein the computer program comprises instructions for executing following processes:
generating a first image based on a signal acquired by the photoelectric conversion element;
acquiring first characteristic information of the photoelectric conversion element; and
performing correction processing including first correction processing on the first image by using the first characteristic information,
wherein, in the correction processing, a weighting coefficient of the first correction processing is made different according to a magnitude of a pixel signal in the first image, and wherein the first correction processing includes processing of extracting a defective pixel in the first image, and the weighting coefficient of the first correction processing is changed between the defective pixel and other pixels.

* * * * *